US012087534B2

(12) United States Patent
Yang

(10) Patent No.: US 12,087,534 B2
(45) Date of Patent: Sep. 10, 2024

(54) CIRCUIT BREAKER WITH MANUAL ENERGY-ACCUMULATING UNIT GEARS INTITALLY SEPARATED FROM ONE ANOTHER

(71) Applicant: LS ELECTRIC CO., LTD., Anyang-si (KR)

(72) Inventor: Hong-Ik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 216 days.

(21) Appl. No.: 17/755,954

(22) PCT Filed: Mar. 27, 2020

(86) PCT No.: PCT/KR2020/004278

§ 371 (c)(1),
(2) Date: May 12, 2022

(87) PCT Pub. No.: WO2021/096002

PCT Pub. Date: May 20, 2021

(65) Prior Publication Data

US 2022/0384132 A1 Dec. 1, 2022

(30) Foreign Application Priority Data

Nov. 13, 2019 (KR) ........................ 10-2019-0145093

(51) Int. Cl.
*H01H 71/10* (2006.01)
*H01H 71/02* (2006.01)

(52) U.S. Cl.
CPC ............ *H01H 71/10* (2013.01); *H01H 71/02* (2013.01); *H01H 2235/00* (2013.01)

(58) Field of Classification Search
CPC .... H01H 71/02; H01H 71/10; H01H 2235/00; H01H 3/227; H01H 3/58
See application file for complete search history.

(56) References Cited

U.S. PATENT DOCUMENTS

2010/0025215 A1 2/2010 Toba et al.
2018/0337006 A1 11/2018 Yeckley

FOREIGN PATENT DOCUMENTS

CN 2662804 Y 12/2004
CN 202957195 U 5/2013
(Continued)

OTHER PUBLICATIONS

Japanese Office Action for related Japanese Application No. 2022-523376; action dated Mar. 7, 2023; (3 pages).
(Continued)

*Primary Examiner* — Vanessa Girardi
(74) *Attorney, Agent, or Firm* — K&L Gates LLP

(57) ABSTRACT

The present disclosure relates to a circuit breaker comprising: a circuit breaking part in which contact points of a fixed contact and a movable contact are in contact with each other; and an energy accumulation part for accumulating energy of a closing spring for controlling contact between the fixed contact and the movable contact, wherein the energy accumulation part comprises: an electromotive energy accumulation part; and a manual energy accumulation part separated from the electromotive energy accumulation part by a manual energy accumulation spring, and engaged with the electromotive energy accumulation part by unit of external pressure so as to transmit an inputted rotational force to the electromotive energy accumulation part, thereby accumulating the energy of the closing spring.

6 Claims, 14 Drawing Sheets

(56) References Cited

FOREIGN PATENT DOCUMENTS

| | | | | |
|---|---|---|---|---|
| CN | 104141761 A | | 11/2014 | |
| CN | 104576235 A | | 4/2015 | |
| CN | 104733216 A | | 6/2015 | |
| CN | 105225862 A | | 1/2016 | |
| CN | 205824058 U | | 12/2016 | |
| CN | 106409546 A | | 2/2017 | |
| CN | 108425994 A | | 8/2018 | |
| CN | 208189470 U | | 12/2018 | |
| EP | 2093780 A1 | | 8/2009 | |
| JP | 4707759 B2 | | 3/2011 | |
| KR | 20000015384 A | | 3/2000 | |
| KR | 100295908 B1 | | 5/2001 | |
| KR | 20100127211 A | | 12/2010 | |
| KR | 101536943 B1 | | 7/2015 | |
| KR | 20160122355 | * | 10/2016 | ............. H01H 71/02 |
| KR | 20160122355 A | | 10/2016 | |
| KR | 101769195 B1 | | 8/2017 | |
| WO | 2008117437 A1 | | 7/2010 | |

OTHER PUBLICATIONS

Extended European Search Report for related European Application No. 20887992.4; action dated Feb. 28, 2023; (11 pages).

International Search Report for related International Application No. PCT/KR2020/004278; report dated May 20, 2021; (5 pages).

Written Opinion for related International Application No. PCT/KR2020/004278; report dated May 20, 2021; (4 pages).

Office Action for related Chinese Application No. 202080073570.7; action dated Nov. 30, 2023; (12 pages).

Office Action for related Chinese Application No. 202080073570.7; action dated Apr. 25, 2024; (7 pages).

* cited by examiner

CIRCUIT BREAKER WITH MANUAL ENERGY-ACCUMULATING UNIT GEARS INTITALLY SEPARATED FROM ONE ANOTHER

CROSS-REFERENCE TO RELATED APPLICATIONS

This application is the National Stage filing under 35 U.S.C. 371 of International Application No. PCT/KR2020/004278, filed on Mar. 27, 2020, which claims the benefit of earlier filing date and right of priority to Korea utility model Application No. 10-2019-0145093 filed on Nov. 13, 2019, the contents of which are all hereby incorporated by reference herein in their entirety.

FIELD

The present disclosure relates to a circuit breaker in which primary and secondary bevel gears are engaged with each other only when a manual energy-accumulating handle is inserted into the circuit breaker.

BACKGROUND

In general, a circuit breaker has a fixed contact and a movable contact that may move to a closing position for closing an alive circuit in contact with the fixed contact and to a breaking (trip) position for opening the alive circuit separated from the fixed contact, and the fixed contact and the movable contact are always in contact with each other to allow current to flow. When overcurrent occurs due to a failure at a predefined position on a line, the circuit breaker quickly disconnects the movable contact from the fixed contact and breaks the current, thereby protecting internal circuits and accessories of electronic devices from the overcurrent. The circuit breaker as described above as a device used for providing/breaking high-voltage electric power, such as in a power plant or a substation, has an actuator that may quickly block/separate contact points of the fixed and movable contacts, which are in contact with each other, from each other when necessary. Schemes for driving the actuator may be divided into a manual manipulation scheme, a solenoid manipulation scheme, and a closing spring manipulation scheme. In this regard, the closing spring manipulation scheme via energy-accumulating unit among the schemes for driving the actuator charges a closing spring to be in a state in which energy thereof may be accumulated by a rotational force. Further, in order to prevent accidents when the overcurrent occurs, the closing spring that has accumulated the energy is relaxed to separate the movable contact from the fixed contact and break the current flow.

However, in the existing circuit breaker, the energy-accumulating unit is disposed in a body, so that, after opening a door of the body, the closing spring is charged manually to be in a re-closing state. In this case, there is a problem that an operator is exposed to high voltage. In order to solve such problem, a structure capable of manually charging the closing spring by inputting the rotational force from the outside of the body via manual energy-accumulating unit was developed.

However, in order to input the rotational force from the outside, gears, for example, bevel gears, of the manual energy-accumulating unit are always engaged with each other inside the energy-accumulating unit. In this case, even when the manual energy-accumulating unit is not used, when an electric motor of the energy-accumulating unit is operated, the bevel gears may be instantaneously in a non-rotatable state depending on machined and assembled states of the engaged bevel gears. Further, when the bevel gears become in the non-rotatable state as described above, the electric motor may also become unable to rotate and may be damaged. As the charging of the circuit breaker becomes impossible, insertion of the circuit breaker in abnormal situations such as the overcurrent becomes impossible.

DISCLOSURE

A purpose of the present disclosure is to provide a circuit breaker that, even when manual energy-accumulating unit is disposed, may prevent burnout and damage of energy-accumulating unit.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using unit and combinations thereof indicated in the Claims.

One aspect of the present disclosure provides a circuit breaker including circuit breaking unit including a fixed contact and a movable contact whose contact points are in contact with each other, and energy-accumulating unit for accumulating energy of a closing spring for controlling the contact between the fixed contact and the movable contact, wherein the energy-accumulating unit includes main energy-accumulating unit including a cam shaft, a main output gear disposed on the cam shaft, and a main energy-accumulating casing for accommodating the main output gear therein, and auxiliary energy-accumulating unit including electromotive energy-accumulating unit linked with the cam shaft, and manual energy-accumulating unit linked with the electromotive energy-accumulating unit, wherein bevel gears inside the manual energy-accumulating unit are engaged with each other by an external force to transmit the input external force to the electromotive energy-accumulating unit to accumulate the energy of the closing spring.

In one implementation of the circuit breaker, the electromotive energy-accumulating unit includes a cam shaft-linked groove connected to the cam shaft, an auxiliary output gear disposed in the cam shaft-linked groove, at least one linkage gear linked with the auxiliary output gear, and an electric motor for rotating the linkage gear.

In one implementation of the circuit breaker, the linkage gear includes an electric motor gear linked with a rotation shaft of the electric motor, a primary gear linked with the electric motor gear, a primary upper gear linked with a rotation shaft of the primary gear, a secondary gear linked with the primary gear, and a tertiary gear disposed between the secondary gear and the auxiliary output gear and linked with the secondary gear and the auxiliary output gear.

In one implementation of the circuit breaker, the manual energy-accumulating unit includes a secondary bevel gear linked with the linkage gear, a primary bevel gear engaged with the secondary bevel gear by the external force, a shaft that is a rotation shaft of the primary bevel gear, a spring support formed on the shaft to be spaced apart from the primary bevel gear, a rotation key protruding from a side face in a length direction of the shaft in an area of an end of the shaft, a bush formed in a cylindrical shape with only one side open as a bottom plate is formed between the primary bevel gear and the spring support, wherein a position of the bush is fixed, and a manual energy-accumulating spring disposed between the bottom plate of the bush and the spring support, wherein the manual energy-accumulating spring provides an elastic force in a direction for separating the primary bevel gear from the secondary bevel gear.

In one implementation of the circuit breaker, the secondary bevel gear is linked with a rotation shaft of an integral gear linked with the primary upper gear, and a direction of the external force is a clockwise direction.

The circuit breaker according to the present disclosure may separate the primary bevel gear and the secondary bevel gear from each other in normal times and allow the primary bevel gear and the secondary bevel gear to be engaged with each other only during the manual energy-accumulating, thereby preventing the damage and the deformation of the energy-accumulating unit.

In addition to the above-described effects, the specific effects of the present disclosure will be described together while describing specific details for carrying out the invention below.

DETAILED DESCRIPTION OF THE DISCLOSURE

Figure 1:
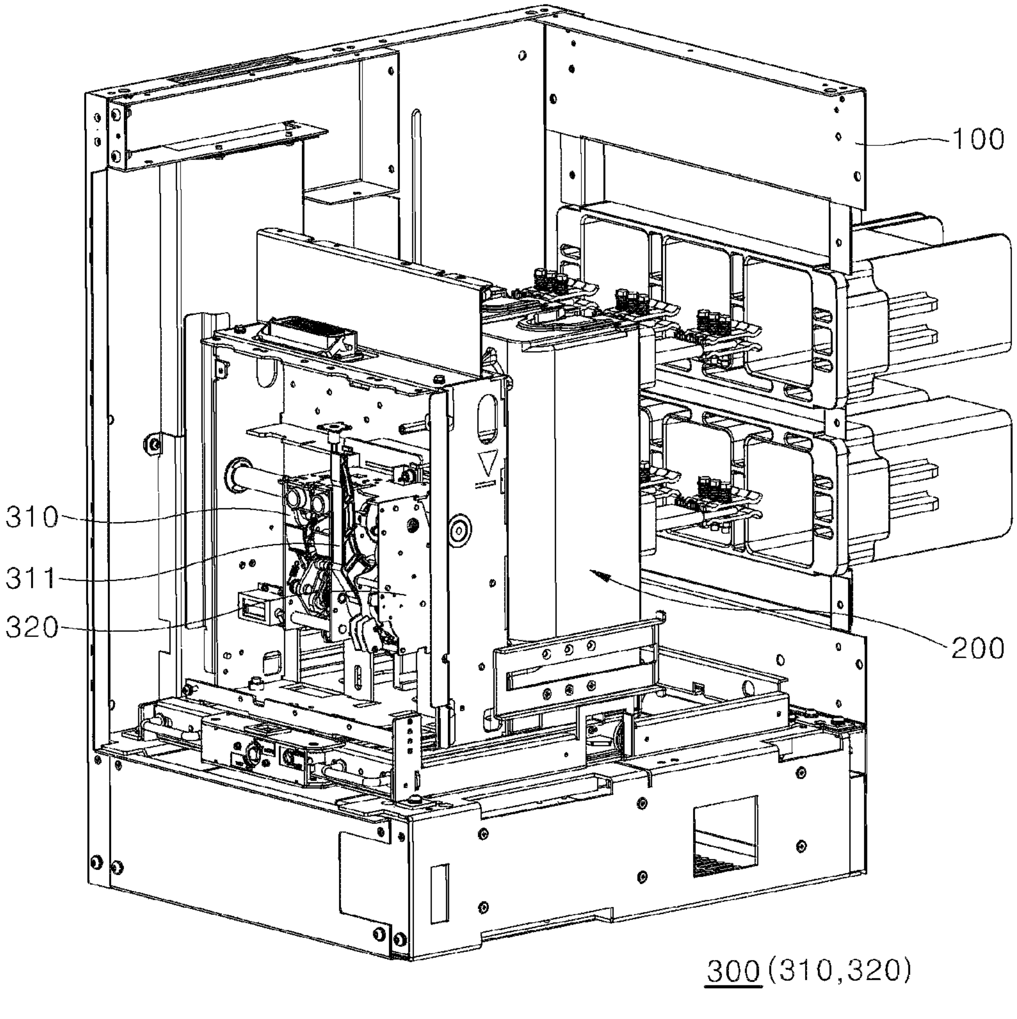
FIGS. 1 to 3 are schematic perspective views of a circuit breaker according to the present disclosure.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Hereinafter, a circuit breaker according to an embodiment of the present disclosure will be described.

Figure 2:
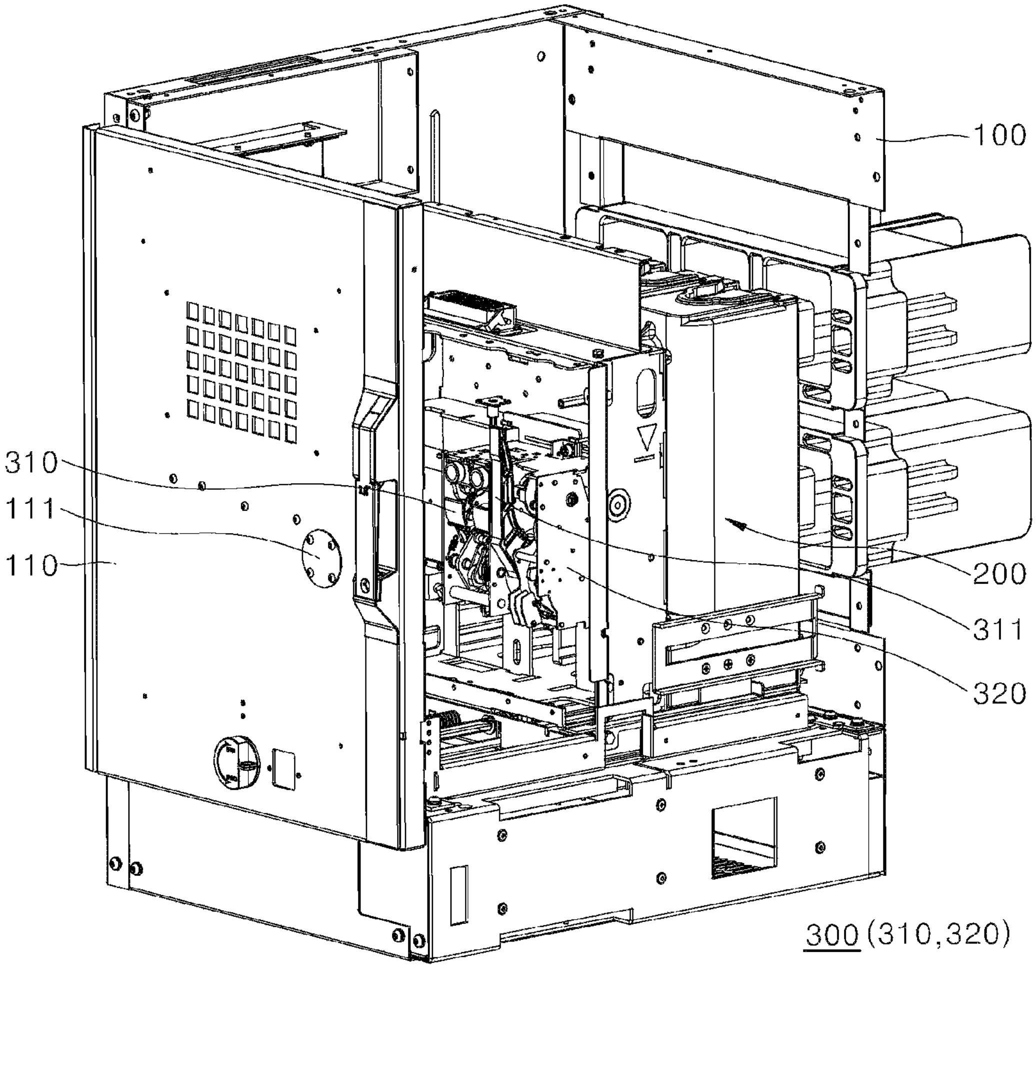
Figure 3:
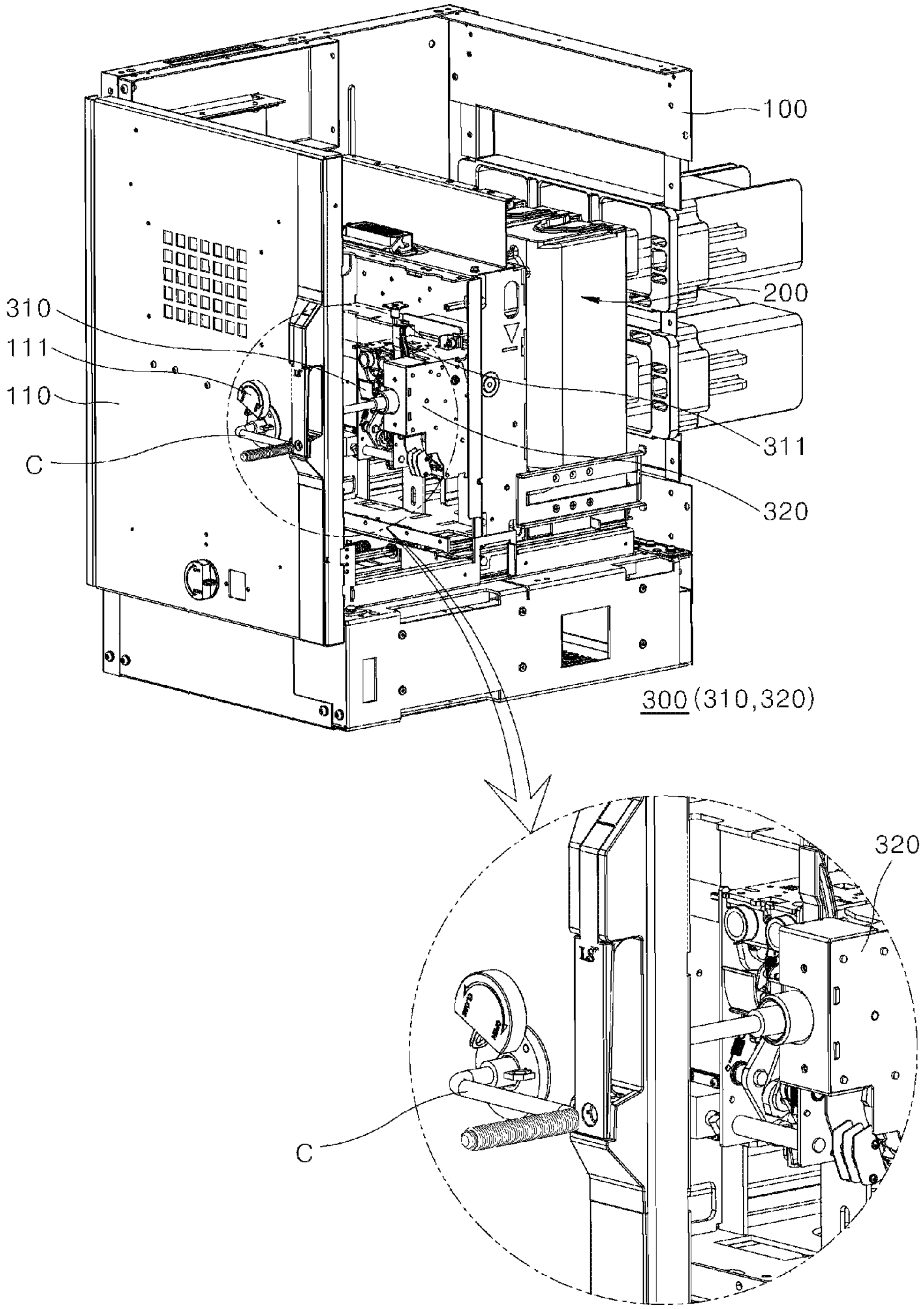

FIGS. 1 to 3 are schematic perspective views of a circuit breaker according to the present disclosure. FIG. 1 is a view with a door removed, FIG. 2 is a view showing the door, and FIG. 3 is a view with a door cover open and a manual energy-accumulating handle inserted.

As shown in FIGS. 1 to 3, the circuit breaker according to the present disclosure includes a body 100, circuit breaking unit 200 disposed in the body 100 and in which contact points of a fixed contact and a movable contact are in contact with each other, and energy-accumulating unit 300 for accumulating energy of a closing spring that actuates the circuit breaking unit 200.

The body 100 accommodates the circuit breaking unit 200 and the energy-accumulating unit 300 therein, and has a door 110 that may be opened and closed on at least one face thereof. Further, the door 110 may have a door cover 111 that is opened and closed such that a manual energy-accumulating handle C for driving manual energy-accumulating unit 340 to be described later is inserted thereinto. In another example, door cover 111 may be omitted.

Figure 4:
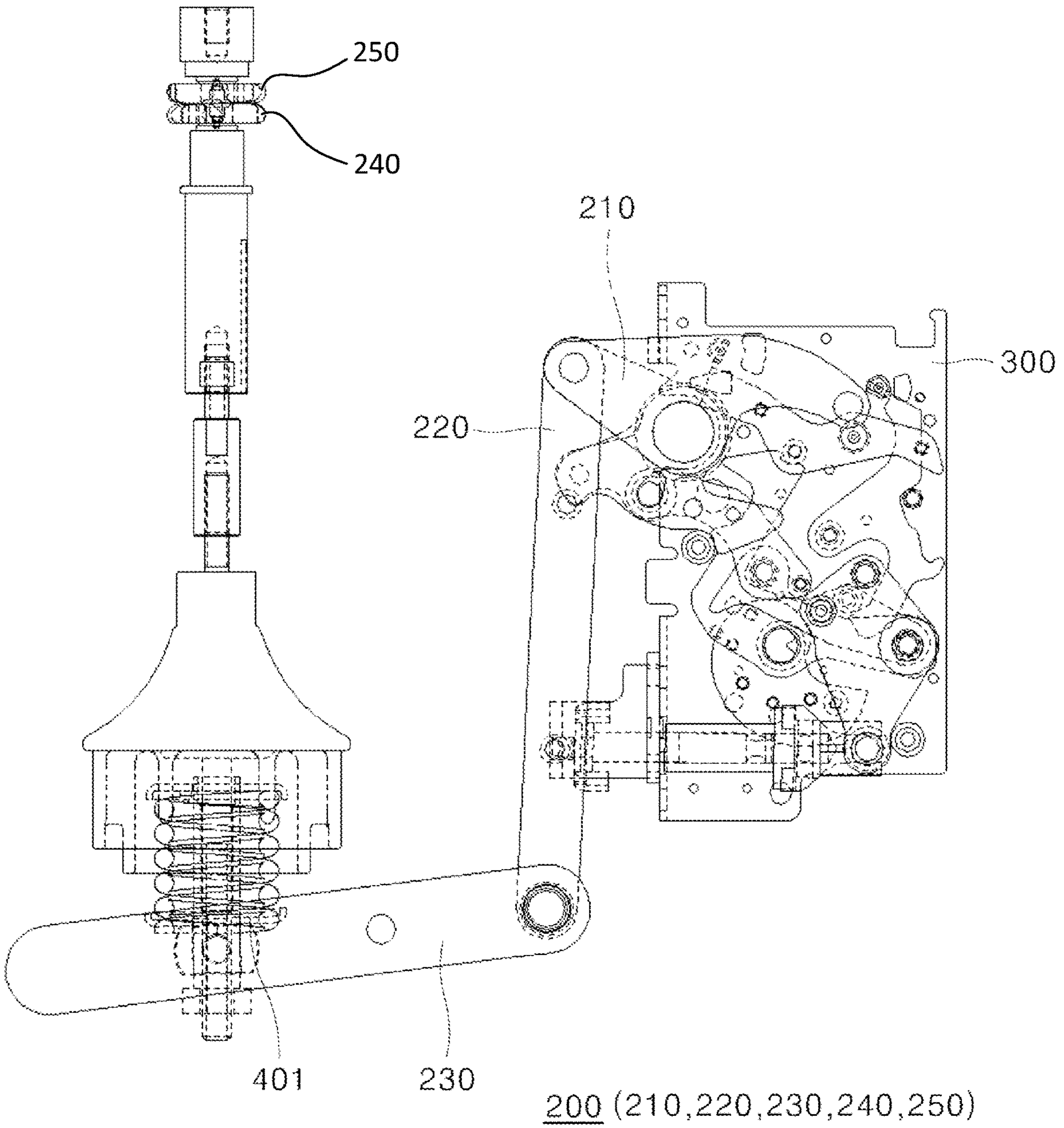
FIG. 4 is a schematic side view of circuit breaking unit in a circuit breaker according to the present disclosure.

FIG. 4 is a schematic side view of circuit breaking unit in a circuit breaker according to the present disclosure.

The circuit breaking unit 200 is disposed in the body 100 and breaks or closes (applies current to) a circuit by a closing spring. Such circuit breaking unit 200 includes a drive shaft 210 that pivots in a vertical direction by the energy-accumulating unit 300, a drive link 220 that performs a vertical reciprocating motion by the drive shaft 210, a drive link 230 that pivots in the vertical direction by the vertical reciprocating motion of the drive link 220, a movable contact 240 that controls closing (electrical conduction) and breaking of the circuit breaker fixed via a fixed contact 250. Because of such structure, when an overcurrent or an accidental current occurs in the state in which the energy of the closing spring 401 is accumulated, the closing spring may 401 be released (relaxed) to separate the movable contact 240 from the fixed contact 250.

the closing spring 401 may be released (relaxed) to separate the movable contact 240 from the fixed contact 250.

In another example, the mechanical portion according to the present disclosure may not be limited to the above-described structure, and any structure may be applied as long as it is a structure capable of breaking the circuit by being driven by the closing spring.

The energy-accumulating unit 300 is for accumulating the energy of the closing spring, and includes main energy-accumulating unit 310 for accumulating the energy of the closing spring, and auxiliary energy-accumulating unit 320 for accumulating the energy of the closing spring by driving the main energy-accumulating unit 310 via an electric motor 333 or manual manipulation.

Figure 5:
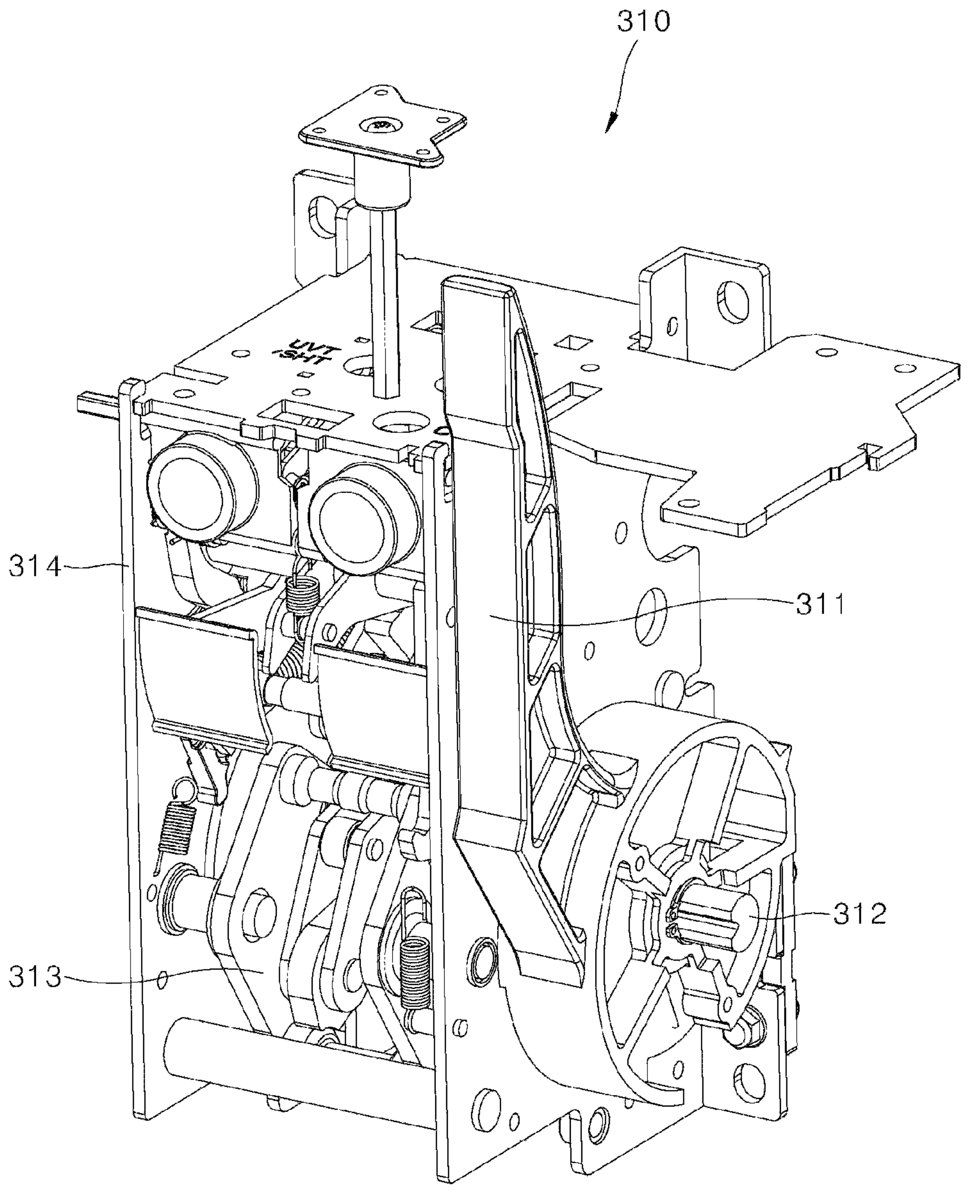
FIG. 5 is a perspective view of main energy-accumulating unit in a circuit breaker according to the present disclosure.

FIG. 5 is a perspective view of the main energy-accumulating unit in a circuit breaker according to the present disclosure.

The main energy-accumulating unit 310 includes a manual handle 311, a cam shaft 312 to which the manual handle 311 is coupled, a main output gear 313 that transmits a rotational force received via the cam shaft 312 to a cam shaft, and a main energy-accumulating casing 314 that accommodates the main output gear 313 therein. Because of such structure, in the main energy-accumulating unit 310, when the manual handle 311 pivots to one side, and the cam shaft 312 connected to the manual handle 311 also rotates. Thus, the main output gear 313 may be operated to manually accumulate the energy of the closing spring. That is, in the main energy-accumulating unit 310, the auxiliary energy-accumulating unit 320 as well as the manual handle 311 are connected, so that not only the energy-accumulating of the closing spring by the electric motor 333 of the auxiliary energy-accumulating unit 320, but also energy-accumulating of the closing spring by the manual handle 311 and energy-accumulating of the closing spring by the manual energy-accumulating handle C are possible.

Figure 6:
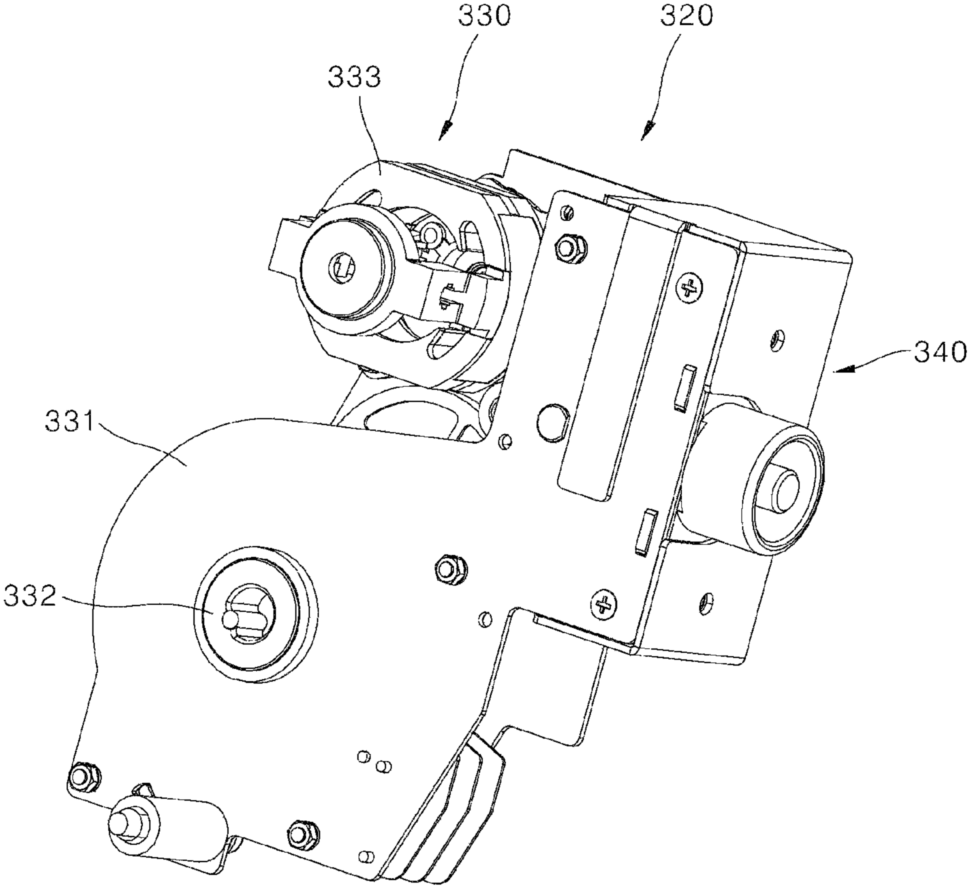
FIG. 6 is a perspective view of auxiliary energy-accumulating unit in a circuit breaker according to the present disclosure.

FIG. 6 is a perspective view of auxiliary energy-accumulating unit in a circuit breaker according to the present disclosure.

The auxiliary energy-accumulating unit 320 rotates the cam shaft 312 (in FIG. 5) by the electric motor 333 or the manual energy-accumulating handle C to accumulate the energy of the closing spring. For this purpose, the auxiliary energy-accumulating unit 320 includes electromotive energy-accumulating unit 330 and manual energy-accumulating unit 340.

Figure 7:
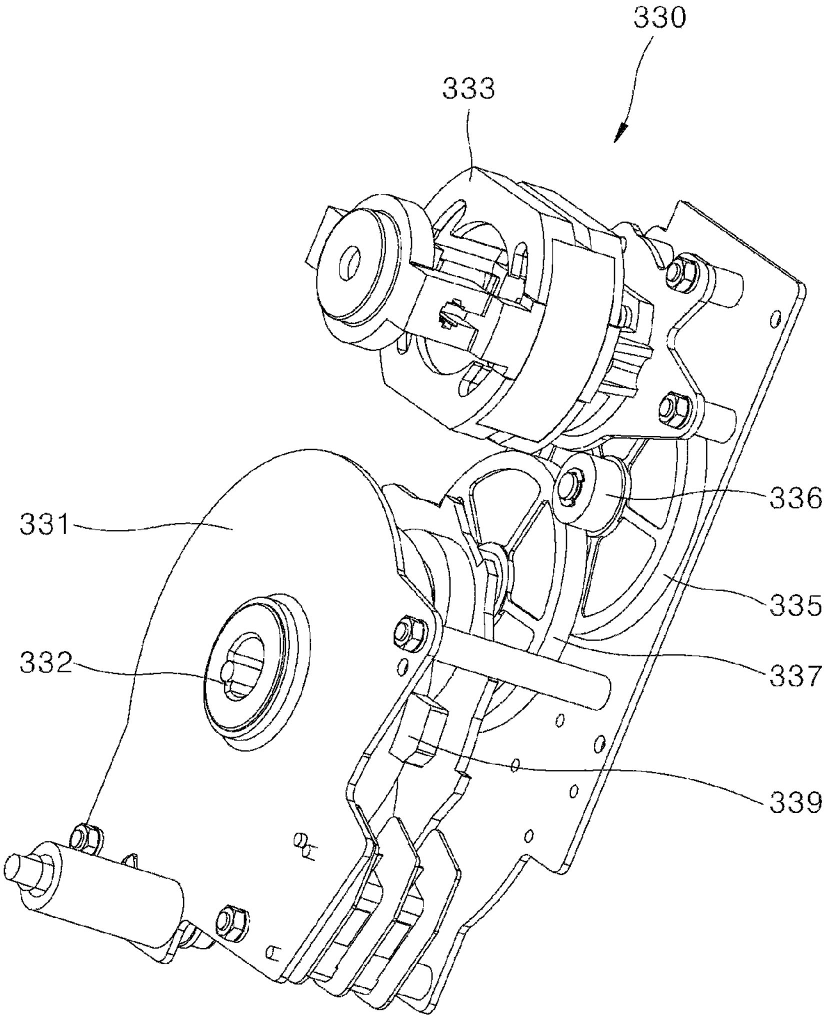
FIG. 7 is a perspective view of electromotive energy-accumulating unit in a circuit breaker according to the present disclosure.
Figure 8:
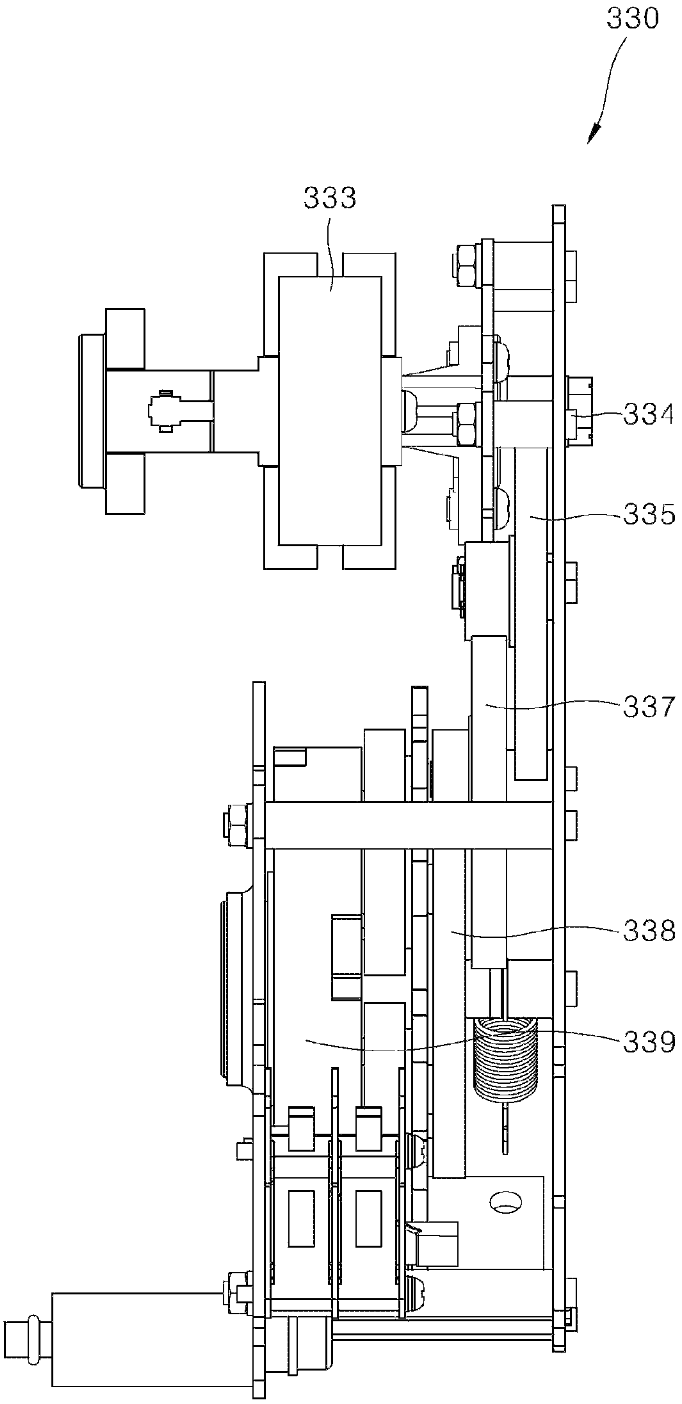
FIG. 8 is a front view of electromotive energy-accumulating unit in a circuit breaker according to the present disclosure.

FIG. 7 is a perspective view of electromotive energy-accumulating unit in a circuit breaker according to the present disclosure. FIG. 8 is a front view of electromotive energy-accumulating unit in a circuit breaker according to the present disclosure.

When control power is supplied to the electric motor 333, the electromotive energy-accumulating unit 330 causes an auxiliary output gear 339 to rotate in response to the operation of the electric motor 333. In this regard, at a position between the electric motor 333 and the auxiliary output gear 339, at least one linkage gear for linking the electric motor 333 and the auxiliary output gear 339 to each other may be disposed.

This embodiment exemplifies a primary gear 335, a secondary gear 337, and a tertiary gear 338 as the at least one linkage gear. Further, in this embodiment, when the electric motor 333 rotates, the electric motor gear 334 rotates, and as the electric motor gear 334 rotates, the primary gear 335, the secondary gear 337, the tertiary gear 338, and the auxiliary output gear 339 sequentially rotate by being linked to each other. Further, a cam shaft-linked groove 332 connected to the auxiliary output gear 339 is assembled with the cam shaft 312 to enable a closing spring charging operation.

Figure 9:
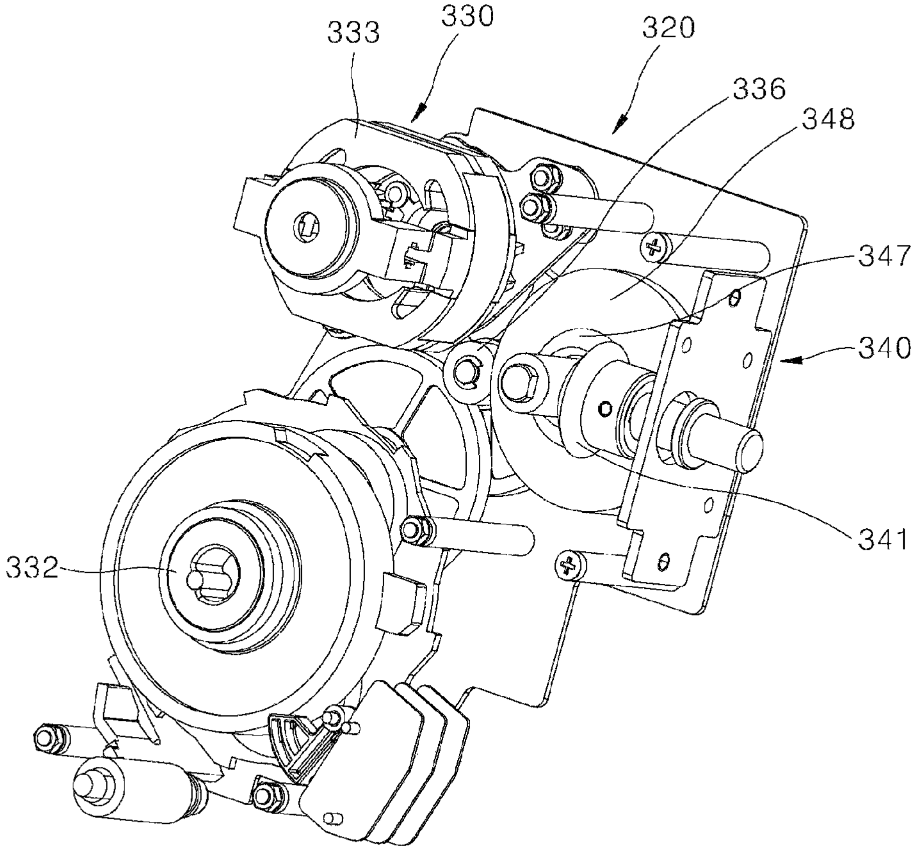
FIG. 9 is a schematic perspective view of auxiliary energy-accumulating unit in a circuit breaker according to the present disclosure.
Figure 10:
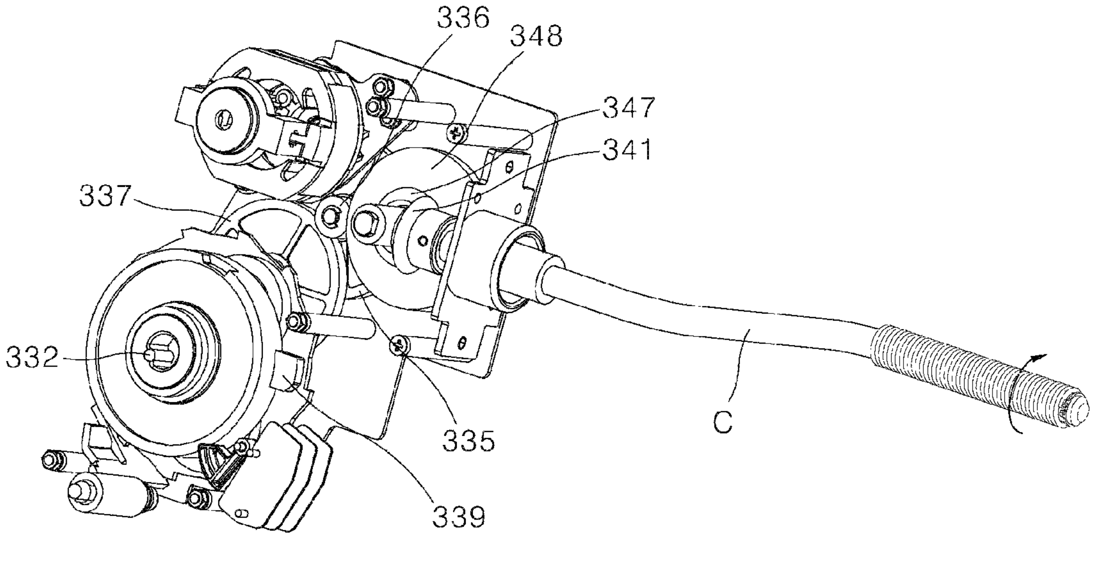
FIG. 10 is a schematic perspective view of auxiliary energy-accumulating unit into which a manual energy-accumulating handle is inserted in a circuit breaker according to the present disclosure.
Figure 11:
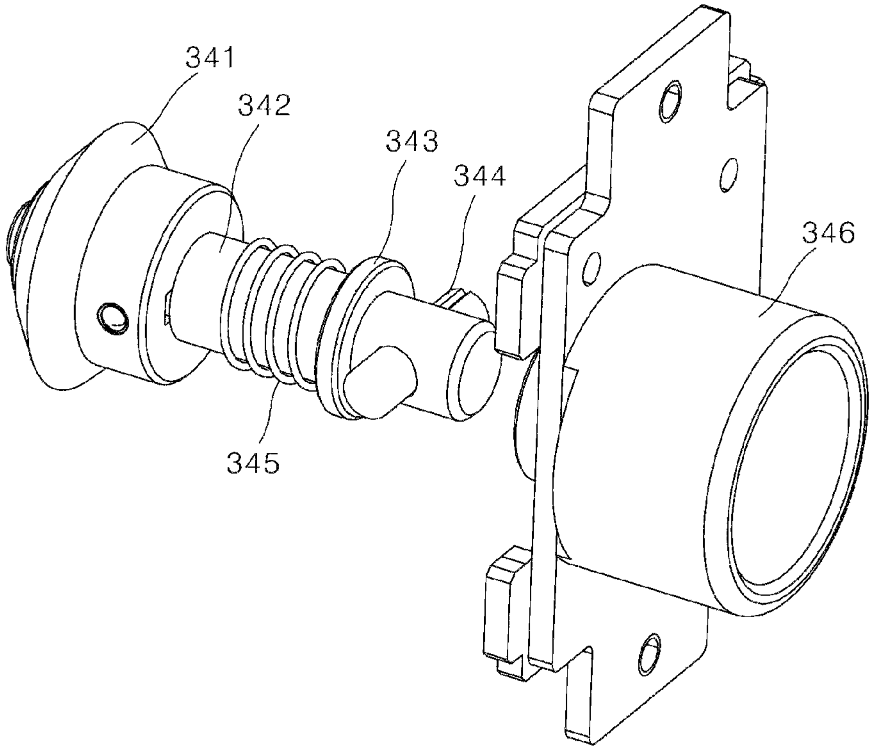
FIG. 11 is a schematic exploded perspective view of manual energy-accumulating unit in a circuit breaker according to the present disclosure.

FIG. 9 is a schematic perspective view of an auxiliary energy-accumulating unit in a circuit breaker according to the present disclosure, and FIG. 10 is a schematic perspective view of an auxiliary energy-accumulating unit into which a manual energy-accumulating handle is inserted in a circuit breaker according to the present disclosure. FIG. 11 is a schematic exploded perspective view of manual energy-accumulating unit in a circuit breaker according to the present disclosure.

The manual energy-accumulating unit 340 rotates the auxiliary output gear 339 manually from the outside, so that the energy of the closing spring is accumulated. More specifically, referring to FIG. 9 and FIG. 10, when the manual energy-accumulating handle C pivots in one direction, for example, in a clockwise direction, the primary bevel gear 341 also rotates in the clockwise direction. Further, the secondary bevel gear 347 linked with the primary bevel gear 341 also rotates. When the secondary bevel gear 347 rotates, a gear 348 integral with the secondary bevel gear 347 also rotates to drive a primary upper gear 336. Accordingly, the secondary gear 337, the tertiary gear 338, and the auxiliary output gear 339 rotate to perform the charging operation of the mechanism.

As shown in FIG. 11, the manual energy-accumulating unit 340 includes the primary bevel gear 341 engaged with the secondary bevel gear 347 by compression, a shaft 342 that is a rotation shaft of the primary bevel gear 341, a spring support 343 disposed on the shaft 342 so as to be spaced apart from the primary bevel gear 341, a rotation key 344 protruding from a side face in a length direction of the shaft 342 at an end of the shaft 342, a bush 346 having a cylindrical shape with only one side open as a bottom plate is formed, wherein the bottom plate is located between the primary bevel gear 341 and the spring support 343 and fixed to an auxiliary energy-accumulating casing 331, and a manual energy-accumulating spring 345 disposed between the bottom plate of the bush 346 and the spring support 343.

The primary bevel gear 341 is engaged with the secondary bevel gear 347 to rotate the secondary bevel gear 347. In this regard, the present disclosure makes the primary bevel gear 341 to be spaced apart from the secondary bevel gear 347 when the manual energy-accumulating unit 340 is not in operation, and makes the primary bevel gear 341 to be engaged with the secondary bevel gear 347 only when the manual energy-accumulating unit 340 is in operation.

The shaft 342 is formed in a shape extending from the rotation shaft of the primary bevel gear 341. The other side of such shaft 342 is exposed to the outside of the auxiliary energy-accumulating casing 331 through the bush 346, which will be described later, and the shaft 342 rotates in engagement with the manual energy-accumulating handle C to rotate the primary bevel gear 341 disposed on one side thereof.

The spring support 343 is disposed on the shaft 342 to support one side of the manual energy-accumulating spring 345. Further, spring support 343 is disposed on the shaft 342 to be spaced apart from the primary bevel gear 341. This embodiment illustrates an O-ring as the spring support 343. However, the present disclosure may not be limited thereto, and the spring support 343 may be formed to extend and protrude circularly from the shaft 342 without being coupled to the shaft 342 in the form of the O-ring. Further, the present disclosure may support said one side of the manual energy-accumulating spring 345 by protruding a protrusion from a side face of the shaft 342 like the rotation key 344 instead of the O-ring-shaped spring support 343. That is, the present disclosure is not limited in the shape and the structure of the spring support 343 as long as it is able to support said one side of the manual energy-accumulating spring 345.

When the manual energy-accumulating unit 340 is operated, the rotation key 344 is coupled to the manual energy-accumulating handle C to rotate the shaft 342. That is, the rotation key 344 serves as a protrusion for rotating the shaft 342, and is disposed on the other side of the shaft 342 to protrude in a direction intersecting the length direction of the shaft 342. Further, the rotation key 344 is disposed on the other side of the shaft 342 to be disposed on the other side of the spring support 343, that is, the primary bevel gear 341, the spring support 343, and the rotation key 344 are disposed on the shaft 342 in the order.

The bush 346 supports the other side of the manual energy-accumulating spring 345 and supports the manual energy-accumulating handle C, which is inserted thereinto when the manual energy-accumulating unit 340 is operated. To this end, the bush 346 has the cylindrical shape having the hollow defined therein with only one side open as the bottom plate is formed on one side as described above, and a hole is defined in the bottom plate to allow the shaft 342 to extend therethrough. Further, an inner face of the bottom plate of said one side supports the other side of the manual energy-accumulating spring 345, and the aforementioned spring support 343 supports said one side of the manual energy-accumulating spring 345. In this regard, the bush 346 is fixed by being coupled to the auxiliary energy-accumulating casing 331, so that the shaft 342 equipped with the primary bevel gear 341, the spring support 343, and the rotation key 344 may reciprocate through the fixed bush 346. In another example, because the spring support 343 is exposed to the outside of the auxiliary energy-accumulating casing 331 through the bush 346 and a bottom face of the bush 346 is located inside the auxiliary energy-accumulating casing 331, the shaft 342 equipped with the primary bevel gear 341, the spring support 343, and the rotation key 344 does not deviate from the fixed bush 346.

The manual energy-accumulating spring 345 is positioned between the bottom plate of the fixed bush 346 and the spring support 343 disposed on the reciprocating shaft 342. Further, accordingly, the spring support 343 is pushed from the bush 346, so that the shaft 342 equipped with the spring support 343 is also pushed out of the auxiliary energy-accumulating casing 331. Therefore, the primary bevel gear 341 disposed on one side of the shaft 342 is also pushed out together with the shaft 342 to be separated from the secondary bevel gear 347. In another example, when the manual energy-accumulating handle C is inserted into the bush 346, is coupled with the other side of the shaft 342 and the rotation key 344, and then applies a pressure to the shaft 342, the manual energy-accumulating spring 345 is compressed. Further, when the manual energy-accumulating spring 345 is compressed, the spring support 343 is moved into the auxiliary energy-accumulating casing 331, and accordingly, the shaft 342 coupled with the spring support 343 and the primary bevel gear 341 disposed on said one side of the shaft 342 are also moved together and engaged with the secondary bevel gear 347.

Figure 12:
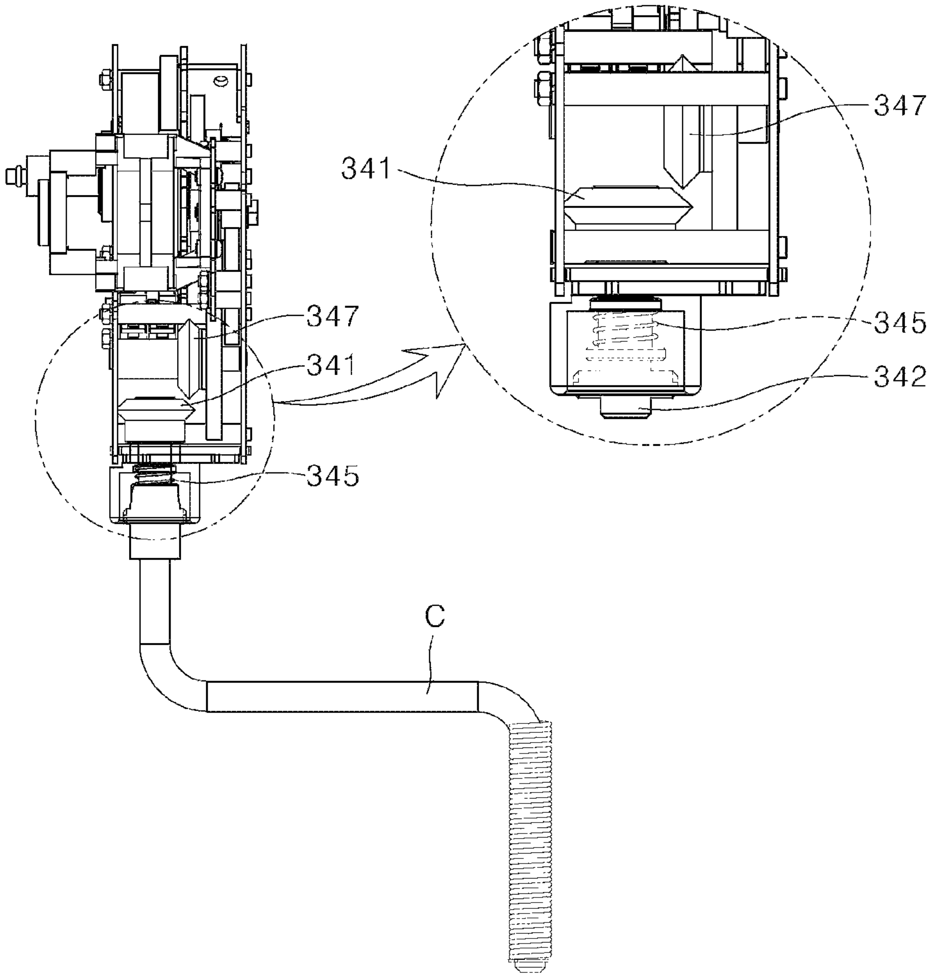
FIG. 12 is a perspective view of manual energy-accumulating unit before a shaft is compressed in a circuit breaker according to the present disclosure.
Figure 13:
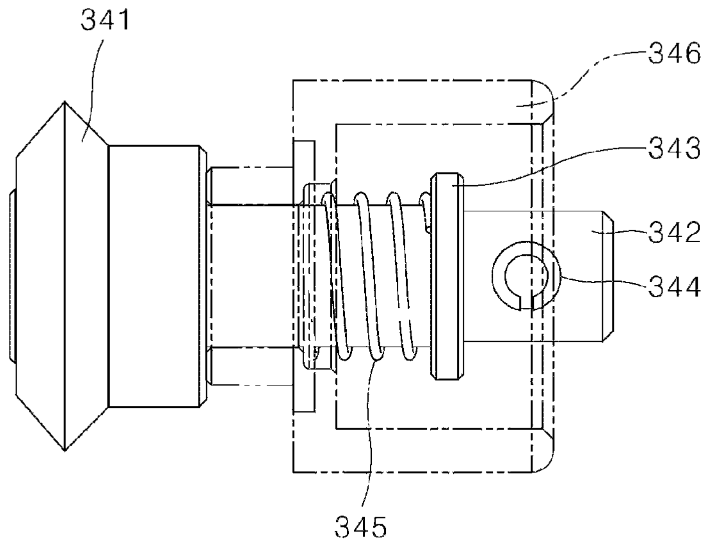
FIG. 13 is a plan view of auxiliary energy-accumulating unit in a state before a manual energy-accumulating handle is inserted to compress a shaft in a circuit breaker according to the present disclosure.

FIG. 12 is a perspective view of manual energy-accumulating unit before a shaft is compressed in a circuit breaker according to the present disclosure, and FIG. 13 is a plan view of auxiliary energy-accumulating unit in a state before a manual energy-accumulating handle is inserted to compress a shaft in a circuit breaker according to the present disclosure.

Referring to FIG. 12 and FIG. 13, before the manual energy-accumulating unit 340 is operated, that is, before the manual energy-accumulating handle C presses the shaft 342, the manual energy-accumulating spring 345 presses the spring support 343 to increase a gap between the bush 346 and the spring support 343. In this regard, the bush 346 is fixed in position, so that only the spring support 343 is moved away from the bush 346, and the shaft 342 coupled with the spring support 343 and the primary bevel gear 341 disposed on said one side of the shaft 342 are also moved following the spring support 343. Further, accordingly, the primary bevel gear 341 may be separated from the secondary bevel gear 347, and the secondary bevel gear 347 may rotate without the influence of the primary bevel gear 341 when the electromotive energy-accumulating unit 300 is operated. That is, the present disclosure makes a distance between the primary bevel gear 341 and the bottom plate of the bush 346 the same as a distance between the secondary bevel gear 347 and the bottom plate of the bush 346 when the manual energy-accumulating spring 345 is compressed, so that the primary bevel gear 341 and the secondary bevel gear 347 are engaged with each other only when the manual energy-accumulating spring is compressed.

Figure 14:
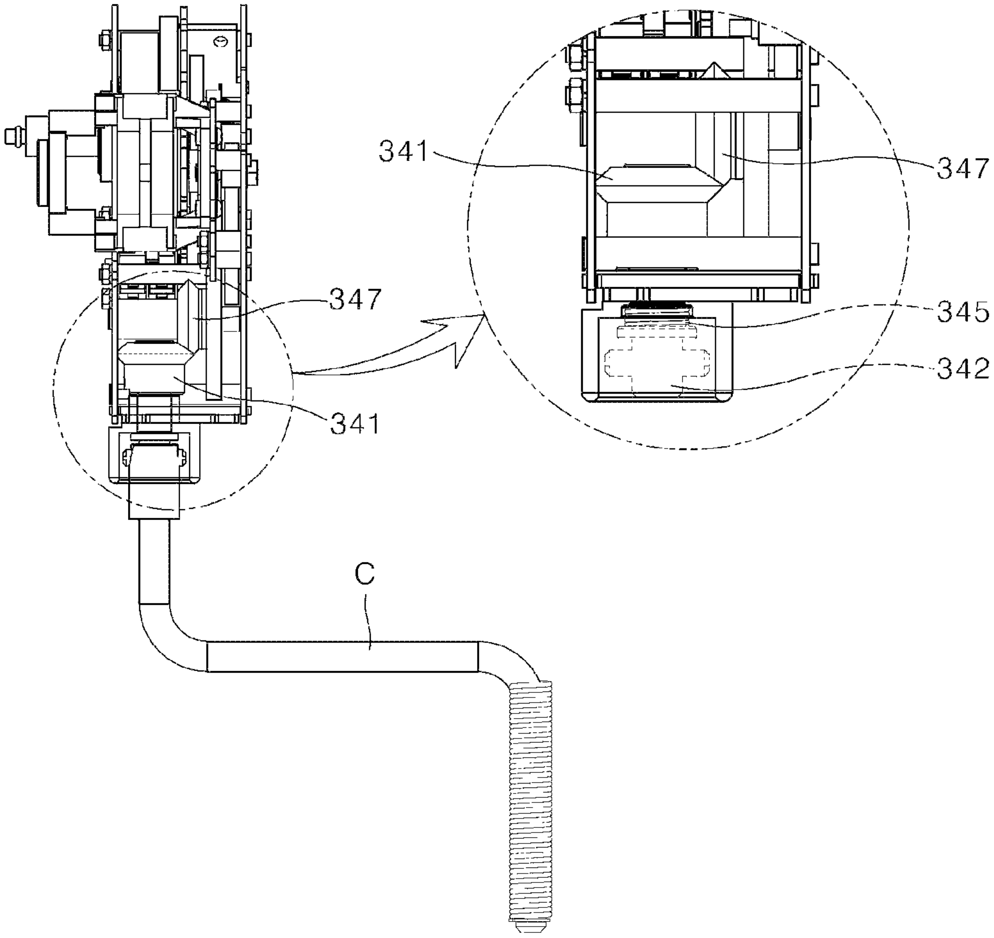
FIG. 14 is a perspective view of manual energy-accumulating unit after a shaft is compressed in a circuit breaker according to the present disclosure.
Figure 15:
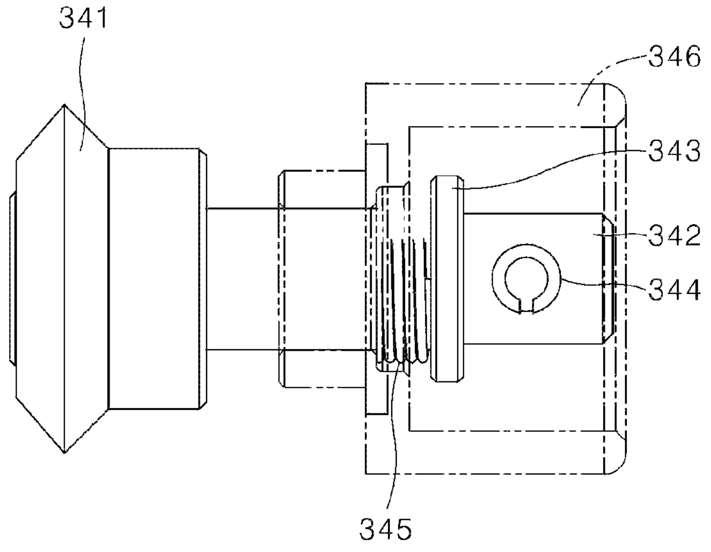
FIG. 15 is a plan view of auxiliary energy-accumulating unit in a state in which a manual energy-accumulating handle is inserted and compresses a shaft in a circuit breaker according to the present disclosure.

FIG. 14 is a perspective view of manual energy-accumulating unit after a shaft is compressed in a circuit breaker according to the present disclosure, and FIG. 15 is a plan view of auxiliary energy-accumulating unit in a state in which a manual energy-accumulating handle is inserted and compresses a shaft in a circuit breaker according to the present disclosure.

Referring to FIG. 14 and FIG. 15, when the manual energy-accumulating unit 340 is operated, that is, the manual energy-accumulating handle C is inserted into the manual energy-accumulating unit 340 and compresses the shaft 342, the spring support 343 is compressed by the manual energy-accumulating handle C to compress the manual energy-accumulating spring 345. In this case, because the position of the bush 346 is fixed, only the spring support 343 comes close to the bush 346, and the shaft 342 coupled with the spring support 343 and the primary bevel gear 341 disposed on said one side of the shaft 342 are moved along the spring support 343. Accordingly, the primary bevel gear 341 is engaged with the secondary bevel gear 347, and the secondary bevel gear 347 is also rotated by the primary bevel gear 341 that rotates in response to the pivoting of the manual energy-accumulating handle C, thereby accumulating the energy of the closing spring.

As described above, the present disclosure separates the secondary bevel gear and the primary bevel gear from each other in normal times, and allows the secondary bevel gear and the primary bevel gear to be engaged with each other only during the manual energy-accumulating, thereby preventing the damage and the deformation of the energy-accumulating unit.

As described above, the present disclosure has been described with reference to the illustrated drawings, but the present disclosure is not limited by the embodiment and the drawings disclosed in the present disclosure, and it is apparent that various modifications may be made by an ordinary person skilled in the art within the scope of the technical idea of the present disclosure. In addition, even when the effect based on the component of the present disclosure has not been explicitly described while describing the embodiment of the present disclosure, it goes without saying that the effect predictable by the corresponding component should also be recognized.

What is claimed is:

1. A circuit breaker comprising:

circuit breaking unit including a fixed contact and a movable contact whose contact points are in contact with each other; and energy-accumulating unit for accumulating energy of a closing spring for controlling the contact between the fixed contact and the movable contact, wherein the energy-accumulating unit includes:

main energy-accumulating unit including a cam shaft, a main output gear disposed on the cam shaft, and a main energy-accumulating casing for accommodating the main output gear; and auxiliary energy-accumulating unit including electromotive energy-accumulating unit linked with the cam shaft, and manual energy-accumulating unit linked with the electromotive energy-accumulating unit, wherein bevel gears inside the manual energy-accumulating unit are engaged with each other by an external force to transmit the input external force to the electromotive energy-accumulating unit to accumulate the energy of the closing spring, wherein the bevel gears comprise a primary bevel gear and a secondary bevel gear, and wherein the primary bevel gear and the secondary bevel gear are arranged to be spaced apart from each other when the manual energy-accumulating unit is not in operation, and to be engaged with each other when the manual energy-accumulating unit is in operation.

2. The circuit breaker of claim 1, wherein the electromotive energy-accumulating unit includes:

a cam shaft-linked groove connected to the cam shaft;

an auxiliary output gear disposed in the cam shaft-linked groove;

at least one linkage gear linked with the auxiliary output gear; and an electric motor for rotating the linkage gear.

3. The circuit breaker of claim 2, wherein the linkage gear includes:

an electric motor gear linked with a rotation shaft of the electric motor;

a primary gear linked with the electric motor gear;

a primary upper gear linked with a rotation shaft of the primary gear;

a secondary gear linked with the primary gear; and a tertiary gear disposed between the secondary gear and the auxiliary output gear and linked with the secondary gear and the auxiliary output gear.

4. The circuit breaker of claim 3, wherein the manual energy-accumulating unit includes:

the secondary bevel gear linked with the linkage gear;

the primary bevel gear engaged with the secondary bevel gear by the external force;

a shaft that is a rotation shaft of the primary bevel gear;

a spring support formed on the shaft to be spaced apart from the primary bevel gear;

a rotation key protruding from a side face in a length direction of the shaft in an area of an end of the shaft;

a bush formed in a cylindrical shape with only one side open as a bottom plate is formed between the primary bevel gear and the spring support, wherein a position of the bush is fixed; and a manual energy-accumulating spring disposed between the bottom plate of the bush and the spring support, wherein the manual energy-accumulating spring provides an elastic force in a direction for separating the primary bevel gear from the secondary bevel gear.

5. The circuit breaker of claim 4, wherein the secondary bevel gear is linked with a rotation shaft of an integral gear linked with the primary upper gear.

6. The circuit breaker of claim 4, wherein a direction of the external force is a clockwise direction.

* * * * *